June 20, 1950 S. E. SHAFFER 2,512,176
FLOAT CONTROLLED IRRIGATION DEVICE
Filed Jan. 10, 1949 2 Sheets-Sheet 2

INVENTOR
S. E. Shaffer
ATTYS

Patented June 20, 1950

2,512,176

UNITED STATES PATENT OFFICE 2,512,176

FLOAT CONTROLLED IRRIGATION DEVICE

Stanley E. Shaffer, Merced, Calif.

Application January 10, 1949, Serial No. 70,109

6 Claims. (Cl. 137—104)

This invention is directed to, and it is an object to provide, a novel irrigation device; the device being adapted for connection to a water supply hose, and operative to automatically shut off the flow, upon the water about the device reaching a predetermined level.

Another object of the invention is to provide an irrigation device, as above, which embodies a locking mechanism operative to automatically, but manually releasably, lock said device against reopening upon the lowering of the surrounding water level, whereby to prevent undesirable recurring irrigation flow from the device.

A futher object of the invention is to provide an irrigation device which includes a novel outlet arrangement which assures against washing away of the ground directly beneath, and on which, the device is supported.

An additional object of the invention is to provide an irrigation device which is compact and light in weight, so that it is manually portable with ease and convenience.

A further object of the invention is to provide an irrigation device which is designed for ease and economy of manufacture.

A further object of the invention is to provide a practical and reliable irrigation device, and one which is exceedingly effective for the purpose for which it is designed.

These objects are accomplished by means of such structure and relative arrangement of parts as will fully appear by a perusual of the following specification and claims.

Figure 1:
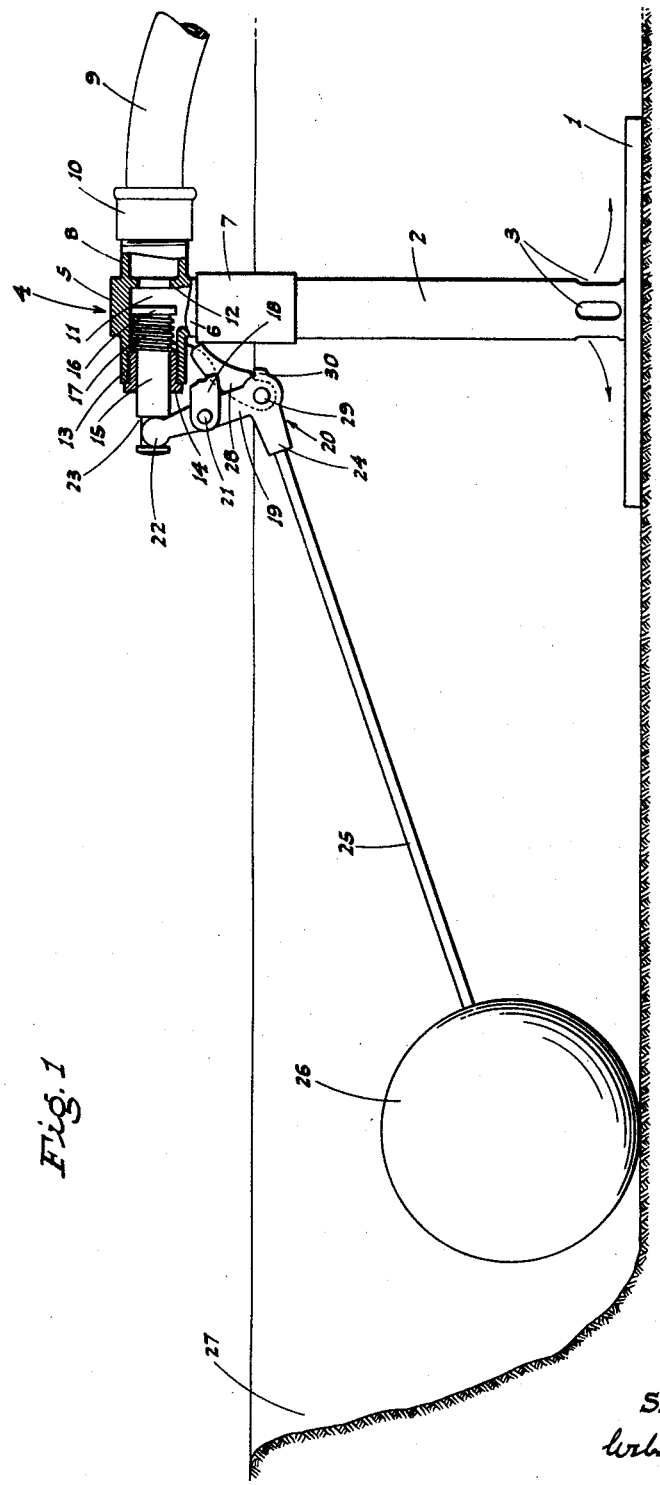
Fig. 1 is a side elevation of the device positioned in an irrigation basin for use; the parts of the device being shown in the positions occupied thereby when the valve is open.

Referring now more particularly to the characters of reference on the drawings the improved irrigation device comprises a flat base 1 having a tubular standard 2 fixed thereon in upstanding position; such tubular standard 2 preferably being centered on the base 1.

At its lower end portion the tubular standard 2 is formed with a circumferential row of water outlet ports 3.

The upper end of the tubular standard 2 is fitted with a valve unit, indicated at 4, which unit comprises a valve body 5 in the form of a T; the central leg 6 of said T body projecting downwardly and being connected in communication with the upper end of the tubular standard 2 by means of a coupling sleeve 7.

One laterally projecting neck 8 of the T body 5 is threaded for connection of a water supply hose 9 thereto by means of a coupling 10.

Between the laterally projecting neck 8 and the central chamber 11 of the body 5 there is formed, within said body, an annular valve seat 12 having a reduced-diameter bore therethrough; said seat 12 facing in the direction of the other laterally projecting neck 13.

A bushing 14 is threaded into said other laterally projecting neck 13, and a valve plunger 15 slidably engages through said bushing for motion axially of the valve seat 12.

At its inner end the valve plunger 15 includes a valve head 16 adapted to close against the seat 12 after movement across the central chamber 11. If desired, a compensating spring 17 may surround the plunger 15 between the bushing 14 and valve head 16.

It will be recognized that when the valve plunger 15 is urged inwardly to its limit of movement that the valve head 16 closes against the valve seat 12 to shut off flow of water from the water supply hose 9. However, upon outward axial sliding motion of the plunger 15 the valve head 16 retracts from the valve seat 12, permitting water flow into the central chamber 11, down the tubular standard 2, and out through the ports 3.

From the ports 3 the water flows first onto the flat base 1, spreading out thereon and then delivering easily or gently onto the ground whereby to prevent washing away of the latter beneath or adjacent the irrigation device.

The valve plunger 15 is float controlled by means of the following float mechanism:

The laterally projecting neck 13 is formed, on the bottom, with a pair of downwardly and outwardly extending attachment ears 18 which straddle the upstanding leg 19 of a bellcrank lever 20; such leg 19 being pivoted to said ears 18, as at 21, for swinging movement in a plane extending axially of the plunger 15. At its upper end the leg 19 is formed with a fork 22 which is received in a circumferential channel 23 on the outer end portion of the plunger 15, whereby swinging of the bellcrank lever 20 results in axial sliding movement of said plunger 15.

The lower leg 24 of the bellcrank lever 20 projects laterally outwardly, and the inner end of an elongated rod 25 is secured to said leg; the outer end of the rod carrying a ball type float 26.

When the device is in use it is disposed in an irrigation basin 27, such as about the base of a tree, and initially the float is in a lowered position, with the valve unit 4 open. See Fig. 1. With the device in this position water feeds from the supply hose 9, through and out of the device in the manner previously described, gradually filling the irrigation basin 27.

As the irrigation basin 27 fills with water the float 26 gradually rises and causes swinging of the bellcrank lever 20 in a valve closing direction. At a predetermined level of the water in the irrigation basin 27 the float causes complete closing of the valve unit 4, and at this time such valve unit is automatically, but manually releasably, locked against reopening, even when the water level drops in the irrigation basin 27. This result is accomplished by the following locking mechanism:

A locking dog 28 is pivoted at one end, as at 29, to the elbow of the bellcrank lever 20, and thence extends at an upward and inward incline toward the coupling sleeve 7; such locking dog 28, being of a length greater than the distance between said coupling sleeve 7 and the pivot 29 when the bellcrank lever 20 is in valve closing position.

Figure 2:
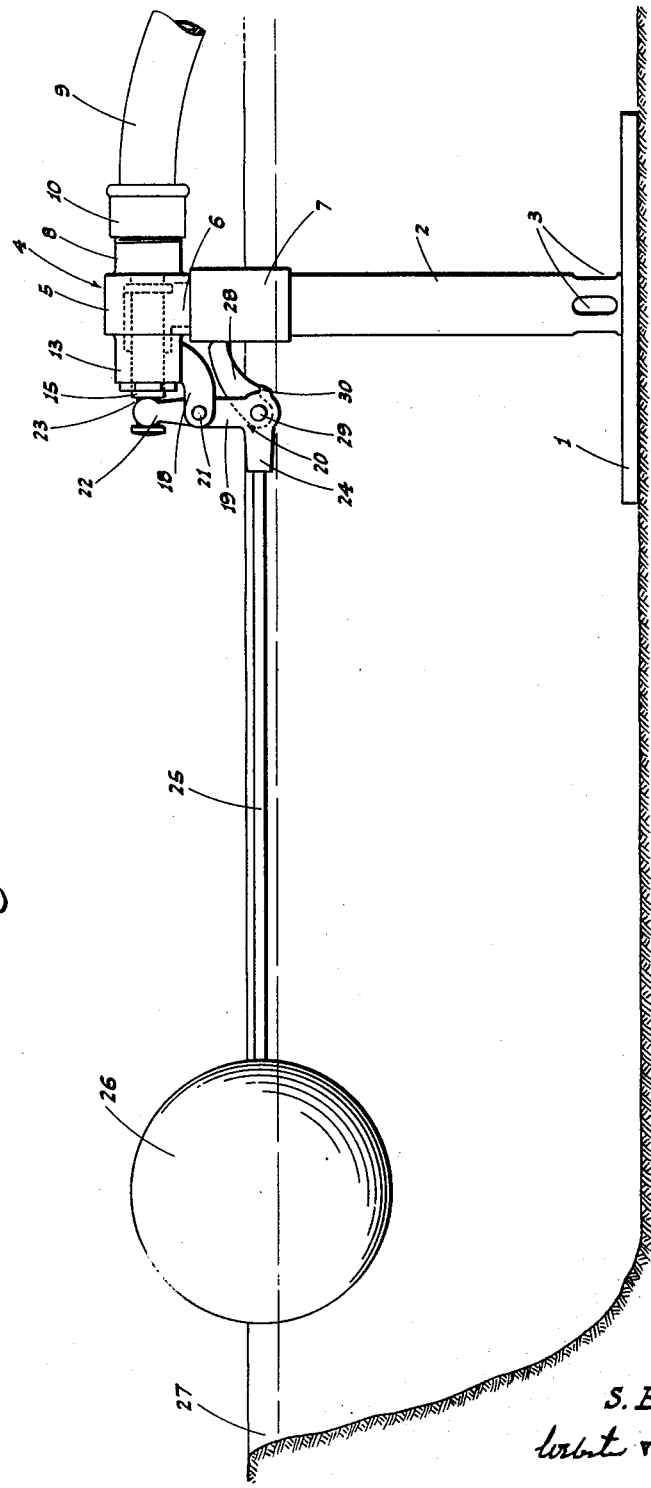
Fig. 2 is a similar view, but shows the device with the parts in valve shut-off and locked position.

At the outset the locking dog 28 occupies an upwardly released position, as in Fig. 1, but as the float 26 rises, with resultant outward swinging movement of the pivot 29, such locking dog gradually rides down said coupling sleeve 7, frictionally binding against the same to prevent return upward motion of said dog. Therefore, when the float 26 is in valve closing position, as in Fig. 2, the locking dog 28 has dropped to a position which automatically prevents the bellcrank lever 20 from swinging in a valve opening direction. Thus, even though the water in the basin 27 seeps away, the irrigation device remains closed for moving to another location by an attendant. To release the locking mechanism and reset the device for the next irrigation operation it is only necessary to manually swing the locking dog 28 between the position as in Fig. 2 to the position as in Fig. 1, whereupon the float 26 lowers to its starting point.

Cooperating stops 30 on the locking dog 28 and the bellcrank lever 20 adjacent its elbow assure against lowering of the locking dog 28 below dead-center.

The described irrigation device provides for the practical, effective, and convenient delivery of water to an irrigation basin, with automatic shut-off after the basin has been filled to a desired level. The device is thus extremely useful by orchardists and others desiring to accomplish controlled irrigation as distinguished from general flooding.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. An irrigation device comprising a base, a tubular standard on the base, there being a water outlet port in the standard adjacent the base, a valve unit mounted on the upper end of the standard in outlet communication therewith, said valve unit being adapted for connection to a water supply hose, and means to open and close the valve unit; said means including a float, and other means cooperating with the above means operative to automatically, but normally releasably, lock said valve unit in valve closed position.

2. An irrigation device comprising a support, a valve unit mounted on the support, said valve unit being adapted to connect to a water supply hose, water level responsive means to close the valve unit, and other means cooperating with said water level responsive means arranged to automatically, but manually releasably, lock said valve unit against reopening after closing by said water level responsive means; the latter including a float controlled lever, and said other means being a swingable locking dog positioned to move to a lever locking position upon said lever moving to a valve closing position.

3. An irrigation device comprising a support, a valve unit mounted on the support, said valve unit being adapted to connect to a water supply hose, the valve unit including a plunger slidable to close said unit, a pivoted lever connected to the plunger in sliding relation thereto, a water level responsive float connected to the lever in actuating relation thereto, whereby rising of the float to a predetermined point causes swinging of the lever, and sliding the plunger, in directions, and to positions, to close the valve unit, and other means arranged to automatically, but manually releasably, lock said lever in said valve closing position upon the float rising to said point; said other means being a locking dog pivoted on the lever for swinging motion to a locked position bearing on a fixed part of the device.

4. An irrigation device comprising a base, a standard on the base, a valve unit mounted on the upper end of the standard, said valve unit being adapted for connection to a water supply hose, the valve unit including a laterally projecting valve control plunger, a plunger actuating lever pivotally mounted intermediate its ends below the plunger for swinging in a plane, and in a direction, to urge the plunger inwardly to a valve closing position, the lower part of the lever moving away from the standard upon swinging of the lever in said direction, an upwardly and inwardly inclined locking dog pivoted on said lower part of the lever and projecting into engagement with the standard, the dog being of a length to bind against said standard when the lever swings in said direction, and water level responsive means to so swing the lever.

5. An irrigation device comprising a base, a standard on the base, a valve unit mounted on the upper end of the standard, said valve unit being adapted for connection to a water supply hose, the valve unit including a laterally projecting valve control plunger, a plunger actuating lever pivotally mounted intermediate its ends below the plunger for swinging in a plane, and in a direction, to urge the plunger inwardly to a valve closing position, the lower part of the lever moving away from the standard upon swinging of the lever in said direction, an upwardly and inwardly inclined locking dog pivoted on said lower part of the lever and projecting into engagement with the standard, the dog being of a length to bind against said standard when the lever swings in said direction, and water level responsive means to so swing the lever; said last named means being a float connected to said lever.

6. An irrigation device comprising a base, a tubular standard on the base, there being a water outlet port in the standard adjacent the base, a valve unit mounted on the upper end of the standard in outlet communication therewith, the valve unit including a T-body whose central neck is connected to the standard, one lateral neck being adapted to connect to a water supply hose, a valve unit control plunger slidably projecting out of the other lateral neck of the T-body, inward sliding of the plunger closing said valve unit, an attachment ear depending from said other lateral neck below the plunger, a bell crank lever below said other lateral neck, such lever including an upstanding leg connected in actuating relation to the plunger, a lower leg of the bellcrank lever projecting laterally outward, means pivoting the upstanding leg intermediate its ends to the attachment ear, a rod projecting outward from the lower leg, a float on the outer end of the rod, and an upwardly and inwardly inclined locking dog pivoted to the bellcrank lever adjacent its elbow and below its pivot, said dog engaging the standard and being of a length to slide down said standard and bind against the same when said lever is swung, by upward motion of the float, in a direction to move the plunger inward.

STANLEY E. SHAFFER.

REFERENCES CITED

The following references are of record in the file of this patent:

UNITED STATES PATENTS

| Number | Name | Date |
| --- | --- | --- |
| 395,726 | Walter | Jan. 8, 1889 |
| 445,510 | Black | Jan. 27, 1891 |
| 673,695 | Blueher | May 7, 1901 |
| 1,022,345 | Watkins | Apr. 2, 1912 |
| 2,020,463 | Fillmann | Nov. 12, 1935 |
| 2,145,052 | Lund | Jan. 24, 1939 |
| 2,148,419 | Parker | Feb. 21, 1939 |
| 2,289,889 | Stick | July 14, 1942 |